(12) United States Patent
Cao et al.

(10) Patent No.: US 10,467,322 B1
(45) Date of Patent: Nov. 5, 2019

(54) SYSTEM AND METHOD FOR HIGHLY SCALABLE DATA CLUSTERING

(75) Inventors: Yong Gang Cao, Seattle, WA (US); Shashank Gupta, Sammamish, WA (US); Adam C. Sanders, Seattle, WA (US); Srikanth Thirumalai, Clyde Hill, WA (US)

(73) Assignee: Amazon Technologies, Inc., Reno, NV (US)

( * ) Notice: Subject to any disclaimer, the term of this patent is extended or adjusted under 35 U.S.C. 154(b) by 452 days.

(21) Appl. No.: 13/473,473

(22) Filed: May 16, 2012

Related U.S. Application Data

(60) Provisional application No. 61/616,908, filed on Mar. 28, 2012.

(51) Int. Cl.
*G06F 17/00* (2019.01)
(52) U.S. Cl.
CPC .................................. *G06F 17/00* (2013.01)
(58) Field of Classification Search
CPC ...................................................... G06F 17/00
See application file for complete search history.

(56) References Cited

U.S. PATENT DOCUMENTS

| | | | | |
|---|---|---|---|---|
| 6,035,284 A * | 3/2000 | Straub et al. | | 705/28 |
| 6,038,574 A * | 3/2000 | Pitkow et al. | | 715/210 |
| 6,424,971 B1 * | 7/2002 | Kreulen et al. | | 707/737 |
| 6,556,991 B1 * | 4/2003 | Borkovsky | | 707/737 |
| 7,185,001 B1 * | 2/2007 | Burdick et al. | | |
| 7,308,451 B1 * | 12/2007 | Lamping et al. | | 707/737 |
| 7,698,335 B1 * | 4/2010 | Vronay | | 707/737 |
| 7,769,760 B2 * | 8/2010 | Watanabe et al. | | 707/737 |
| 7,962,486 B2 * | 6/2011 | Adair et al. | | 707/737 |
| 8,055,592 B2 * | 11/2011 | Boyle et al. | | 706/12 |
| 2003/0145002 A1 * | 7/2003 | Kleinberger et al. | | 707/5 |
| 2004/0143600 A1 * | 7/2004 | Musgrove | | G06F 17/30864 |
| 2004/0267636 A1 * | 12/2004 | Ouchi | | 705/27 |
| 2005/0119948 A1 * | 6/2005 | Musgrove | | 705/27 |
| 2005/0182792 A1 * | 8/2005 | Israel | | G06F 17/30038 |
| 2005/0226511 A1 * | 10/2005 | Short | | 382/225 |
| 2007/0078849 A1 * | 4/2007 | Slothouber | | 707/5 |

(Continued)

FOREIGN PATENT DOCUMENTS

EP    1368745 A2    12/2003

*Primary Examiner* — Matthew S Gart
*Assistant Examiner* — Scott M Ross
(74) *Attorney, Agent, or Firm* — Robert C. Kowert; Meyertons, Hood, Kivlin, Kowert & Goetzel, P.C.

(57) ABSTRACT

Various embodiments of a system and method for highly scalable data clustering are described. Embodiments may include generating contexts of information from item-level data for multiple items; each context may include tokens that each represents an aggregate characteristic of items associated with that context. Embodiments may also include comparing the tokens of different contexts to determine measures of similarity between the contexts. Embodiments may also include grouping at least some of the contexts into clusters with other contexts based on the determined measures of similarity. Embodiments may include, subsequent to detecting a first context and a second context as being members of a common cluster, correcting item level-data of an item associated with the second context based on item-level data of an item associated with the first context.

26 Claims, 6 Drawing Sheets

(56) References Cited

U.S. PATENT DOCUMENTS

| | | | |
|---|---|---|---|
| 2007/0143235 A1* | 6/2007 | Kummamuru et al. | 706/15 |
| 2007/0198600 A1* | 8/2007 | Betz | 707/201 |
| 2008/0201102 A1* | 8/2008 | Boettcher et al. | 702/179 |
| 2009/0070346 A1* | 3/2009 | Savona et al. | 707/100 |
| 2010/0005048 A1* | 1/2010 | Bodapati et al. | 706/47 |
| 2010/0076972 A1* | 3/2010 | Baron et al. | 707/736 |
| 2010/0082623 A1* | 4/2010 | Arora et al. | 707/737 |
| 2011/0035379 A1* | 2/2011 | Chen et al. | 707/740 |
| 2011/0264598 A1* | 10/2011 | Fuxman et al. | 705/343 |
| 2012/0078719 A1* | 3/2012 | Bhagwan et al. | 705/14.54 |
| 2012/0259882 A1* | 10/2012 | Thakur et al. | 707/767 |
| 2012/0265761 A1* | 10/2012 | Atsmon et al. | 707/740 |
| 2012/0310787 A1* | 12/2012 | Gaikwad et al. | 705/27.1 |
| 2012/0317120 A1* | 12/2012 | Zhong et al. | 707/740 |
| 2013/0060662 A1* | 3/2013 | Carlson et al. | 705/26.61 |
| 2013/0124525 A1* | 5/2013 | Anderson et al. | 707/737 |
| 2013/0198192 A1* | 8/2013 | Hu et al. | 707/738 |
| 2013/0211950 A1* | 8/2013 | Nice et al. | 705/26.7 |
| 2013/0238623 A1* | 9/2013 | Wyllie et al. | 707/737 |
| 2013/0262465 A1* | 10/2013 | Galle et al. | 707/737 |

\* cited by examiner

SYSTEM AND METHOD FOR HIGHLY SCALABLE DATA CLUSTERING

PRIORITY INFORMATION

This application claims benefit of priority to U.S. Provisional Patent Application No. 61/616,908 filed Mar. 28, 2012 titled "SYSTEM AND METHOD FOR HIGHLY SCALABLE DATA CLUSTERING," which is hereby incorporated by reference herein in its entirety.

BACKGROUND

Electronic marketplaces, such as those available via the Internet, offer goods and services to customers. Customers may browse through electronic item descriptions, which may include textual descriptions of items as well as photographs or other electronic representations of a product of interest. In one example, item descriptions may be viewed as web pages on the Internet via a web browser. In many cases, these item descriptions may include item information from supplying vendors and/or manufacturers. A given item's item information may include details about a product, such as a title, brand, size, weight, and other attributes of the item. At least some of this information may be conveyed to customers as part of item details pages. Furthermore, at least some of the item information may be used for structuring an electronic marketplace website through which the item detail pages are made available. For instance, such a web site may include navigational controls that enable a user to narrow the scope of item searches based on brand name or other product attributes. From a merchant standpoint, managing and using the item information is generally not an insignificant undertaking as the breadth of item catalogs may span a relatively large quantity of items.

Figure 1:
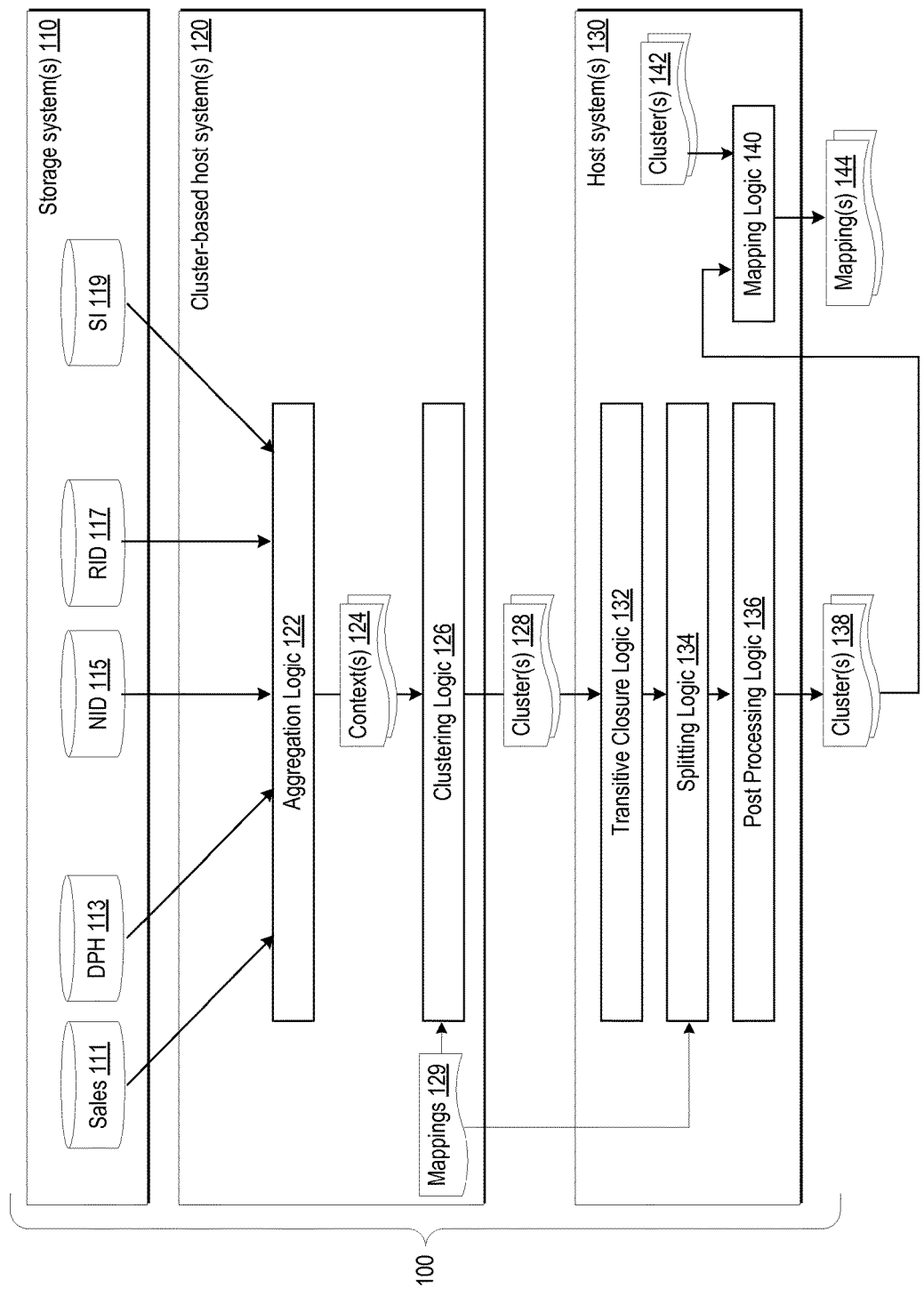
FIG. 1 illustrates a block diagram of a clustering system for performing highly scalable data clustering, according to some embodiments.

While the system and method for highly scalable data clustering is described herein by way of example for several embodiments and illustrative drawings, those skilled in the art will recognize that the system and method for highly scalable data clustering is not limited to the embodiments or drawings described. It should be understood, that the drawings and detailed description thereto are not intended to limit the system and method for highly scalable data clustering to the particular form disclosed, but on the contrary, the intention is to cover all modifications, equivalents and alternatives falling within the spirit and scope of the system and method for highly scalable data clustering as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various embodiments of a system and method for highly scalable data clustering are described. Embodiments may include techniques for clustering data into groups of similar entities, such as groups of data items having attributes that are the same or similar. Clustering techniques of various embodiments may be highly scalable such that numerous data items may be processed without exceeding available time and/or processing resources. Embodiments may be largely described within the context of item data for an item catalog (e.g., a catalog of items offered for sale), although embodiments are not limited to performing clustering techniques on these types of data items.

As described in more detail below, to bolster scalability of the clustering system described herein, embodiments may include multiple techniques to reduce the overall time and/or computing resources spent to identify clusters of similar data items. For instance, context-based processing may be utilized to condense a given set of data items into a smaller set of contexts on which operations may be performed. Furthermore, the techniques described herein may utilize token comparisons and other parameters in order to reduce the number of local comparisons of contexts during cluster generation.

In various embodiments, the local comparisons of contexts may scale efficiently but may in some cases yield at least some clusters that overlap. The clustering system may perform one or more merge operations on these clusters to combine overlapping clusters. In some cases, clusters may be aggressively merged and the clustering system may perform one or more operations to split at least some of these clusters. As described in more detail below, there may be one or more additional techniques performed to fine-tune the composition of clusters.

Embodiments may be utilized for a variety of use cases including but not limited to attribute normalization across data for different items. For instance, consider all the televisions sold by Acme, a fictitious maker of televisions. Some of such televisions may be sold under the brand name "Acme" whereas others may also be marketed under a premium product line, such as the fictitious product line name "ClearView." Embodiments of the clustering system described herein may generate contexts for these brand names and use clustering techniques to cluster these contexts together. These results may be used for a variety of purposes including but not limited to data normalization. For instance, based on the clustering results, items having a brand name attribute of "ClearView" could instead be modified to have the more representative brand name "Acme." In various embodiments, this type of data normalization may provide a more unified and cohesive electronic marketplace. For instance, users searching for one brand may be presented with items of all relevant brands belonging to the same cluster. In another case, attribute information such as brand name may be used to limit the scope of search results within an electronic marketplace. Normalizing the attributes based on the clustering techniques described herein may provide more accurate scoping of search results.

Clustering System

FIG. 1 illustrates one example of a clustering system according to various embodiments. In the illustrated embodiment, clustering system 100 may include one or more storage system(s) 110, cluster-based host system(s) 120, and host system(s) 130. In various embodiments, one or more of these systems may be implemented on a computer system, such as that of FIG. 6 described below. In various embodiments, one or more of these systems may be substituted with one or more services of a service-oriented architecture. In some embodiments, a combination of systems and services may be utilized. In various embodiments, cluster-based host system(s) 120 may include a cluster of computers configured to coordinate together to perform a larger job. For instance, cluster-based host system(s) 120 may represent a Hadoop cluster configured to implement aggregation logic 122 and/or clustering logic 126. In other cases, cluster-based host system(s) 120 may be substituted with a single computer or multiple computers that do not necessarily operate in a clustered manner. While aggregation logic 122 and clustering logic 126 are illustrated on a different system than transitive closure logic 132, splitting logic 134 and post processing logic 136, any and/or all of these components may be implemented together on one or more of the same systems.

In the illustrated embodiment, clustering may be performed on contexts that are generated based on item-level data of storage system(s) 110. The data from which contexts are generated may include item level information for multiple different items including but not limited to items offered for sale in an electronic marketplace. Generally, the item level information may correspond to a particular item and include one or more attributes about that item. A given item's item level data may span multiple data sets illustrated in FIG. 1. In the illustrated embodiments, storage system(s) 110 may include a sales data store 111 that may store sales information for different items. This sales information may include but is not limited to unit sales for a particular item (e.g., how many units of an item have sold). In various embodiments, sales information for a particular item may include sales for a specific time period (e.g., units sold in a specific day or week). Storage system(s) 110 may also include a detail page hits (DPH) data store 113, which for a given item may store a quantity of times that the item's detail page has been viewed by customers. For instance, an item's detail page may include a web page listing for the item within an electronic marketplace. The DPH for that item may include the number of times that web page was viewed. DPH may also be specified for a particular time period (e.g., day, week, month etc.). In various embodiments, sales and/or DPH information may in some cases serve as a measurement of a given item's "impact." For instance, an item that is heavily viewed and/or purchased may have a higher impact than a less popular item. In various embodiments, one or more components or processes may periodically or aperiodically update data stores 111 and 113 with new sales and DPH information.

Storage system(s) 110 may also include a normalized item data store 115, which may store one or more item attributes for items. These attributes may include information provided by supplying vendors and/or manufacturers. Examples of attributes include but are not limited to title, weight, dimensions, color, size, author, and/or other attributes. In some cases, normalized item data may include different types of attributes for different types of items. In one non-limiting example, a key attribute of a television might be screen size whereas a key attribute of a t-shirt might be material composition (e.g., cotton, polyester, etc.). As such, the types of items attributes tracked for different items may vary. In some cases, an individual item may have different values for attributes. For instance, normalized item data may include information sourced from different supplying vendors that use different nomenclature for attributes and/or attribute values. In other cases, a supplying vendor's item data may simply be incorrect or inaccurate. In various embodiments, the different item data for each item may undergo a reconciling process to create the information of reconciled item data store 117. In various embodiments, the item level information of reconciled item data store 117 may be designated as authoritative item data for items. For instance, if normalized item data 115 includes conflicting values for a specific attribute of an item, reconciled item data may include a specific value selected as the authoritative value for that specific attribute. In various embodiments, the reconciled data may be the item attributes that are exposed to customers in item detail pages of an electronic marketplace. In various embodiments, one or more components or processes may periodically or aperiodically update data stores 115 and 117 with normalized and reconciled information.

Search impression data store 119 may store information and/or statistics about the relationship between items and searches performed in an electronic marketplace in which the items are sold. For instance, one type of search impression information for a given item may include the quantity of times in which that item appeared in lists of search results. Generally the search impression of an item that appears in many search result lists will be higher than that of an item that appears in fewer search result lists. Another example of search impression information for a given item may include a yield measurement, such as a ratio of the number of times an item is selected from a search result list relative to the number of times that item is presented to customers as a result in a search result list.

Cluster-based host systems 120 may be configured to aggregate the item-level information described herein to generate contexts, upon which clustering logic 126 and other downstream components may operate to generate clusters. These contexts are illustrated as context(s) 124 and may be generated by aggregation logic 122. Contexts may include a unique identifier and information derived from the item level information of storage system(s) 110. The description herein may refer to contexts as brand contexts that correspond to item brands, although the techniques described herein are not limited to brand attributes. Clustering system 100 may perform context-based clustering for any attribute in various embodiments. The contents of an example brand context are enumerated below:

Brand name (e.g., "Acme")
Product type (e.g., "Digital_Camera")
Top Term Frequency—Inverse Document Frequency (TF-IDF) token(s) for selected attributes
Aggregated Impact Data In various embodiments, one or more of the context attributes may serve as a unique identifier for the context. For instance, the brand name and product type (e.g., <Acme, Digital_Camera>) may serve as the identifier for the brand context presented above. In various embodiments, different contexts may exist for different product types even for products of the same manufacturer. For instance, there may exist two different contexts <Acme, Digital_Camera> and <Acme, Television>.

As noted above, the brand context may include a brand name, which may represent a brand name present within the reconciled item data of data store 117. Different contexts may have different brand names. The brand context may also include a product type, which may represent a product type present within the reconciled item data for the corresponding brand name of the context. The top TF-IDF tokens may include the top scoring tokens resulting from a TF-IDF analysis of selected attributes over the data set that is available for a given brand name. For instance, in one non-limiting example, these tokens may include the top scoring TF-IDF tokens for any of the following attributes: brand name, item name, GTIN prefix, and/or manufacturer. The GTIN prefix may be the prefix of a Global Trade Item Number; this prefix may in some cases represent a company code. Use of these tokens is described in more detail below with respect to the clustering logic. In various embodiments, the brand context may also include aggregated impact data. For instance, as described above, in various embodiments, sales and/or DPH information may serve as a measurement of a given item's "impact." For example, an item that is heavily viewed and/or purchased may have a higher impact than a less popular item. The aggregated impact data may include sums of the DPH and unit sales data, respectively, for all items having item level data that matches the brand name and product type of the brand context. Use of this aggregated impact data is described in more detail below with respect to the clustering logic.

In various embodiments, aggregation logic 122 may output context(s) 124 to clustering logic 126, which may generate an initial version of the clusters illustrated as cluster(s) 128. In various embodiments, the clustering logic may be configured to merge sets of context(s) 124 that represent the same brand or likely represent the same brand. In various embodiments, the clustering logic 126 may be configured to cluster contexts on the basis of context tokens, such as the TF-IDF tokens described above. In various embodiments, clustering logic 126 may merge contexts that share one or more of these tokens. For instance, the clustering logic may enforce a rule that designates any two contexts sharing a minimum quantity of tokens as being similar contexts that should be merged. In various embodiments, this minimum quantity of tokens may be a configurable parameter.

The clustering logic described herein may perform multiple local comparisons of contexts to determine which contexts are to be merged. To save time and/or processing resources, embodiments may limit the scope of these local comparisons by eliminating comparisons involving contexts that do not share any tokens in common. The clustering logic may also be configured to filter out large comparisons exceeding some threshold quantity of contexts; this threshold may be a configurable parameter. In one non-limiting example, clustering logic may eliminate comparisons involving 500 or more contexts. For instance, this situation may arise when a large number of contexts share a common token. In various embodiments, a comprehensive local comparison of contexts may operate at an $O(n^2)$ time complexity. As such, performing the aforesaid techniques to limit the scope of the local comparisons may in many cases realize significant savings in time and/or processing resources.

In various embodiments, the clustering logic 126 may generate clusters 128 based on mappings 129. For instance, mappings 129 may include authoritative designations of contexts that are to be merged. In some cases, these authoritative designations may be based on human input or, alternatively, may be determined using automated techniques. In various embodiments, clustering logic may be configured to force the merging of contexts in accordance with mappings 129. In some cases, clustering logic may perform clustering based on mappings 129 before performing the local comparison of contexts in order to save time and/or processing resources. For instance, if two contexts are merged according to the authoritative designations of mappings 129, clustering logic may forgo the token-based comparison of these particular contexts (as such contexts have already been designated for merging).

In various embodiments, contexts that form a cluster may be designated as a preferred context or an alias context. Preferred contexts may represent the contexts into which alias contexts are merged to form a cluster; generally there may be one preferred context within a cluster and one or more alias contexts. This preferred/alias status may be used to perform the data normalization described in more detail below. Generally, one or more attributes of the items associated with a preferred context may be inherited by the items associated with an alias context in the same cluster. In various embodiments, clustering logic 126 may designate contexts within clusters as a preferred context or alias context based on the impact data of the contexts. In some embodiments, within a cluster, the preferred context may be selected as the context that has the highest impact on the basis of unit sales and/or search impact (e.g., presence in search results and/or search yield as described above). In some embodiments, within the cluster, any context not designated as a preferred context may be designated as an alias context.

The clusters generated by clustering logic 126 may be output as cluster(s) 128 and provided to or accessed by transitive closure logic 132 of host system(s) 130. In various embodiments, host system(s) 130 may be implemented by one or more computers, such as that of FIG. 6 described below. Transitive closure logic 132 may be configured to merge overlapping clusters. For instance, some cluster(s) 128 may overlap because a given context may share different tokens with different contexts. For instance, consider the following example scenario:

Brands: "Acme ClearView," "Acme," "ClearView Panel"
Tokens: Acme, ClearView
Context Distribution for Acme: "Acme ClearView," "Acme"
Context Distribution for ClearView: "Acme ClearView," "ClearView Panel"

In this scenario, assuming contexts are merged based on the context data according to the above-described techniques, the following clusters may result:

{"Acme ClearView," "Acme"}, {"Acme ClearView," "ClearView Panel"}

Transitive closure logic 132 may be configured to merge these clusters in response to detecting that such clusters overlap. The resulting cluster in this non-limiting example is as follows:

{"Acme ClearView," "Acme," "ClearView Panel"}

In various embodiments, transitive closure logic 132 may be configured to perform the above-described merging process for all sets of overlapping clusters. Transitive closure logic 132 may pass this condensed set of clusters to splitting logic 134.

In some cases, the clustering process described above may result in one or more aggressively merged clusters, i.e., clusters including contexts that should not reside in the same cluster. Splitting logic 134 may be configured to split aggressively merged clusters by identifying and splitting clusters that contain two or more high impact (e.g., high sales, high page views) contexts. In some cases, authoritative definitions of contexts that should not reside in the same cluster may be specified by mapping information 129 (or inferred from mapping information 129). Splitting logic 134 may be configured to split clusters based on this mapping information.

Post processing logic 136 may include a heuristic process configured to enforce one or more rules on the clusters resulting from splitting logic 134 in order to catch and correct any edge cases that may have passed through previous components. For instance, brand contexts having brand attributes of the form "[Brand] running shoes for . . . " or "[Product line] by [Brand]" may be good candidates for merging with a preferred context. In various embodiments, merging these types of contexts by clustering logic 126 may be avoided as it may not be known at that time if there is a different context more suitable to be a preferred context for such types of contexts. However, after splitting logic 134 and previous logic is performed, contexts following these formats may be good candidates to be merged into the cluster of the corresponding brand if such contexts have small impact (e.g., low sales, low page views, and/or low search yield) and are not otherwise designated as desirable standalone clusters.

In some embodiments, clusters 138 may correspond to a specific time period (e.g., day, week, month etc.). In various embodiments, these clusters may be mapped to a previous set of clusters that correspond to a previous time period, such as clusters 142. For instance, as input data changes over time, the results of the clustering process may also evolve. In various embodiments, host system(s) 130 may include mapping logic 140 configured to detect and map clusters from older clusters 142 sets to a set of newly generated clusters 138. In various embodiments, such techniques may include utilizing the Hungarian algorithm for bipartite matching. The resulting mappings of this process are illustrated as mappings 144.

Figure 2:
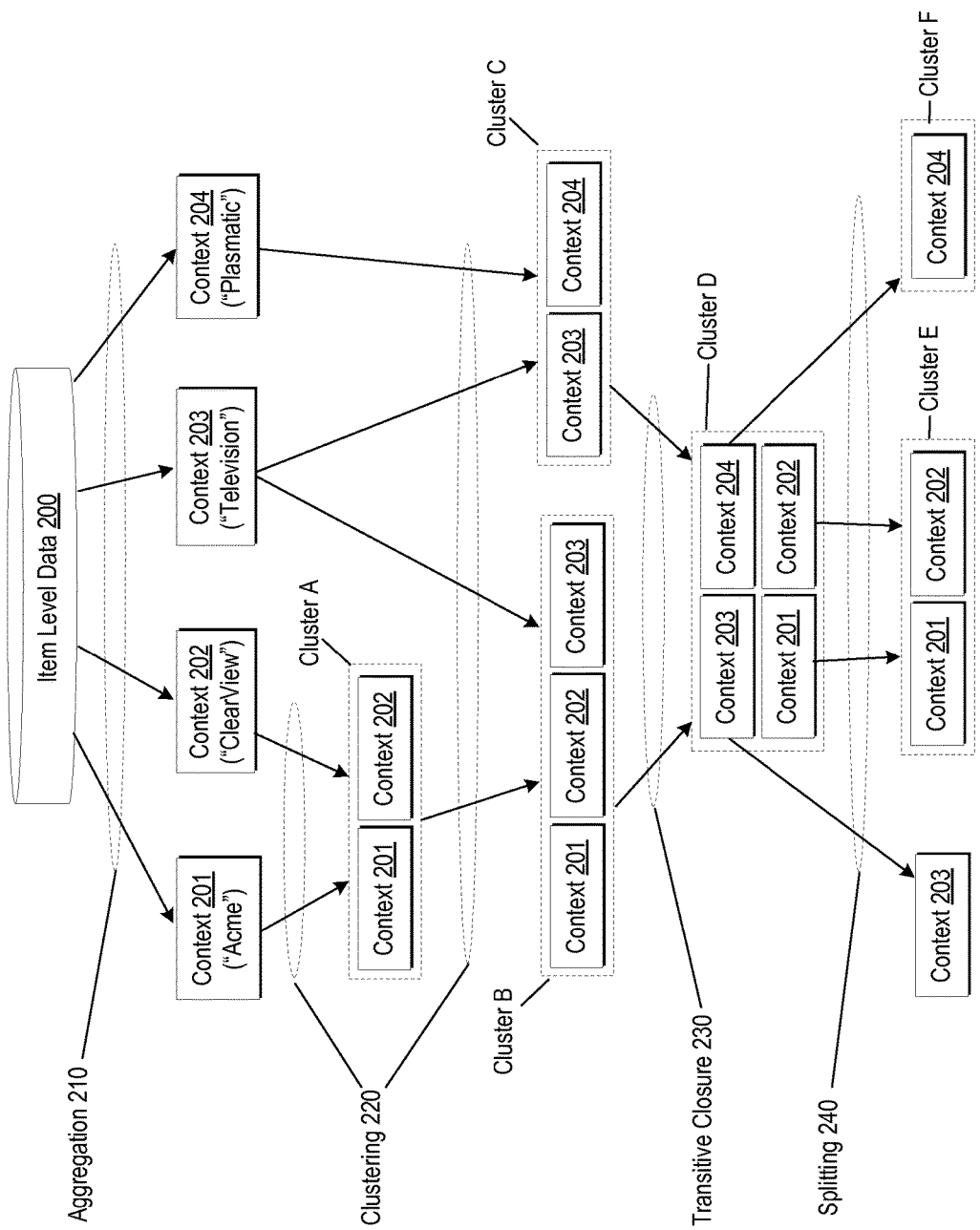
FIG. 2 illustrates a flow diagram for generating clustered contexts from item level data, according to some embodiments.

FIG. 2 illustrates a flow diagram of an example clustering process, according to some embodiments. In the illustrated embodiment, item level data 200 may include any of the item-level information stored within storage system(s) 110. In various embodiments, the clustering system described herein may perform aggregation 210 to create contexts 201-204 from the item level data. This aggregation may adhere to the techniques described above with respect to aggregation logic 122. In the non-limiting example of the illustrated embodiment, four contexts are evaluated. These four contexts may represent many more items for which item level data is available. For instance, an example context <Acme, Digital_Camera> may correspond to all times having Acme as a brand attribute and Digital Camera as a product type.

In the illustrated embodiment, context 201 may represent a fictitious "Acme" brand of television, context 202 may represent a fictitious Acme product line "ClearView," context 203 may represent a "Television" brand of television (e.g., an erroneous brand name caused by an item data error, as described below), and context 204 may represent a fictitious "Plasmatic" brand of television. The contexts may be clustered into clusters A-C according to the clustering techniques described above with respect to clustering logic 126. Clusters B-C may correspond to clusters of cluster(s) 128 described above. In various embodiments, clusters B-C may be generated using the token-based similarity analysis described above with respect to FIG. 1. For instance, the clustering process may enforce a rule that designates any two contexts sharing a minimum quantity of tokens (which may be configurable) as being similar contexts that should be merged into a cluster.

For the following analysis, note that in the illustrative example "television" is an erroneous brand. In various embodiments, this scenario may occur when at least some of the item level data erroneously lists "television" as a brand within an item's attributes. One example of how such an error may occur when a supplying vendor provides incorrect item data for an item. In the illustrated embodiment, this erroneous brand name may manifest itself as a top TF-IDF token for contexts of clusters B and C. As such, in accordance with the transitive closure techniques described above, overlapping clusters B and C may be consolidated into cluster D. As described in more detail below, the "television" brand error that has been propagated as an aggressively merged cluster D may be mitigated by splitting process 240.

Splitting process 240 may be configured to split aggressively merged cluster D based on a listing of brands known to be legitimate. In FIG. 1 described above, this listing of known brands is specified by or derived from mapping information 129, although in some cases the listing of known brands may be specified elsewhere. In the illustrated embodiment, context 201 ("Acme") and context 204 ("Plasmatic") may be identified as known brands in accordance with the listing of known brands. While context 202 ("ClearView) may not be listed on the list of known brands (as it is a product line, not a true brand), it may be identified as an alias context to context 201. As such, context 202 may remain in a cluster with context 201, as illustrated as cluster E. Context 203, which represents the erroneous "Television" brand, may essentially be abandoned as a cluster as it is not listed on the list of know brands and is also not an alias to any other brand context. The result of the example analysis is two clusters, cluster E and cluster F.

Figure 3:
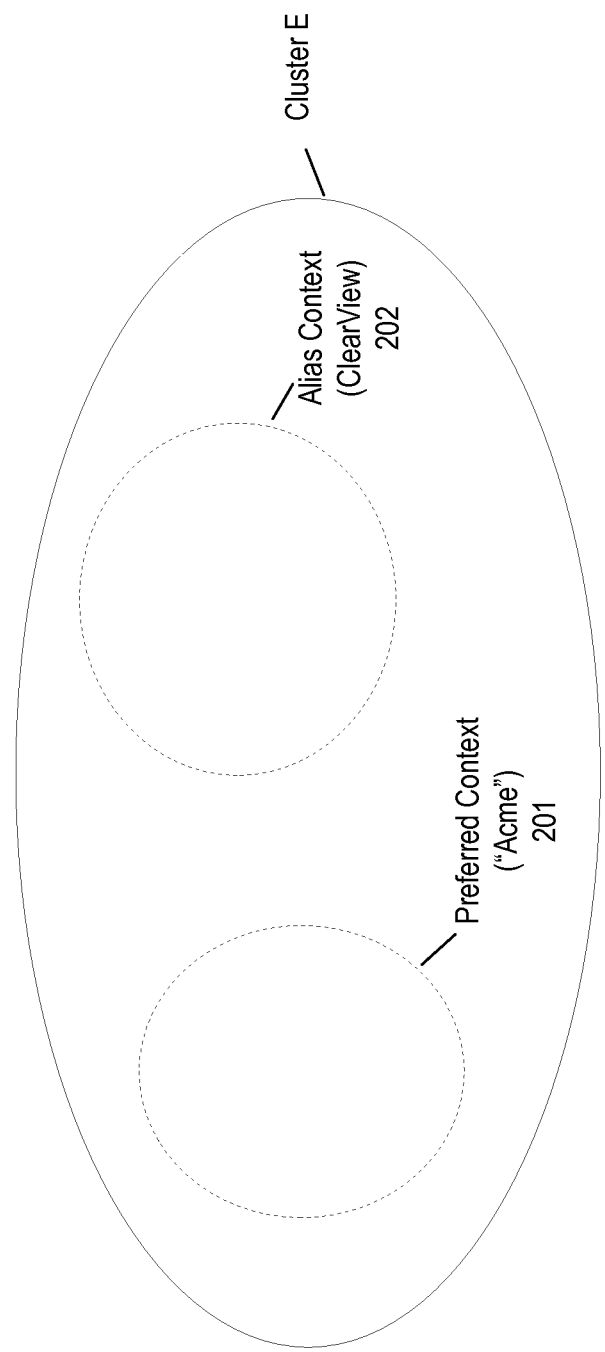
FIG. 3 illustrates an example graphical representation of the mapping between a cluster, multiple contexts, and multiple data items, according to some embodiments.
Figure 4:
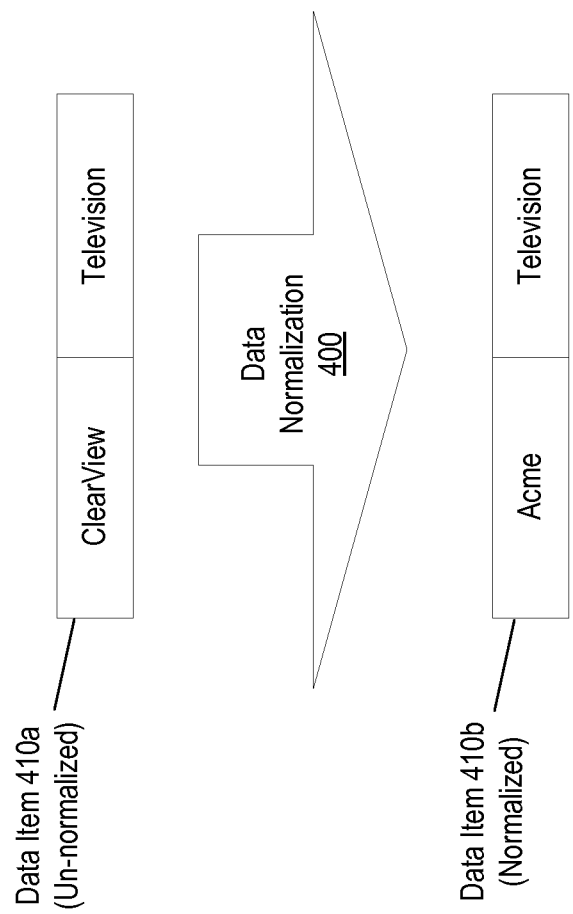
FIG. 4 illustrates a flow diagram for data normalization including the transformation of a data item from an un-normalized state to a normalized state, according to some embodiments.

FIG. 3 illustrates a graphical representation of how clusters and contexts map to one another, according to some embodiments. In the illustrated embodiment, a cluster E may include two contexts, namely context 201 and context 202. Cluster E, context 201 (corresponding to an "Acme" brand), and context 202 (corresponding to a "ClearView" brand), may be as described with respect to FIG. 2. In various embodiments, a preferred context 201 may represent the contexts into which a alias context 202 is merged to form a cluster; generally there may be one preferred context within a cluster and one or more alias contexts. This preferred/alias status may be used to perform data normalization (e.g., correction of one or more item attributes), as illustrated in FIG. 4 below. Note that in the illustrated embodiment of FIG. 3, a single context may map to multiple data items. Generally, these data items represent information from the data sources of storage system(s) 110 described above. As such, in various embodiments, determining that one data context is to be merged into another data context may actually propagate data normalizing changes to multiple data items (each corresponding to a respective item, such as an item offered for sale). In various embodiments, the clustering system may designate contexts within clusters as a preferred context or alias context based on the impact data associated with the contexts. In some embodiments, within a cluster, the preferred context may be selected as the context that has the highest impact on the basis of unit sales and/or search impact (e.g., presence in search results and/or search yield as described above). In some embodiments, within the cluster, any context not designated as a preferred context may be designated as an alias context.

FIG. 4 illustrates one example of using the preferred/alias context information to perform data normalization. Generally, one or more attributes of the items associated with a preferred context 201 may be inherited by the items associated with an alias context 202 in the same cluster E (see e.g., FIG. 3). In the illustrated embodiment of FIG. 4, an un-normalized data item 410a may include attributes associated with a context as described above. These are, in order of left to right, brand name and product type, for example. Embodiments described herein may perform a data normalization process 400 on un-normalized data item 410a to generate a normalized data item 410b. Normalizing may include imparting the brand attribute of the preferred context to the un-normalized data item. For instance, in the illustrated embodiment, the brand of the un-normalized data item is changed from "ClearView" to "Acme" to generate normalized data item 410b. This process may be repeated for all data items associated with alias contexts within a cluster. Over time, the quality of the item level data (e.g., items 111-119 of FIG. 1) may be improved as this normalization process is performed on multiple data items.

Example Method(s)

The system and method for highly scalable data clustering may include various methods, examples of which are described in more detail below. In various embodiments, the methods described herein may be performed by one or more computer systems, such as the computer system described below with respect to FIG. 6. For instance, the method may be implemented by one of such computer systems or by a group of computer systems operating in a coordinated and/or distributed manner. In some cases, one or more portion of the method may be implemented by one or more services of a service-oriented architecture.

Figure 5:
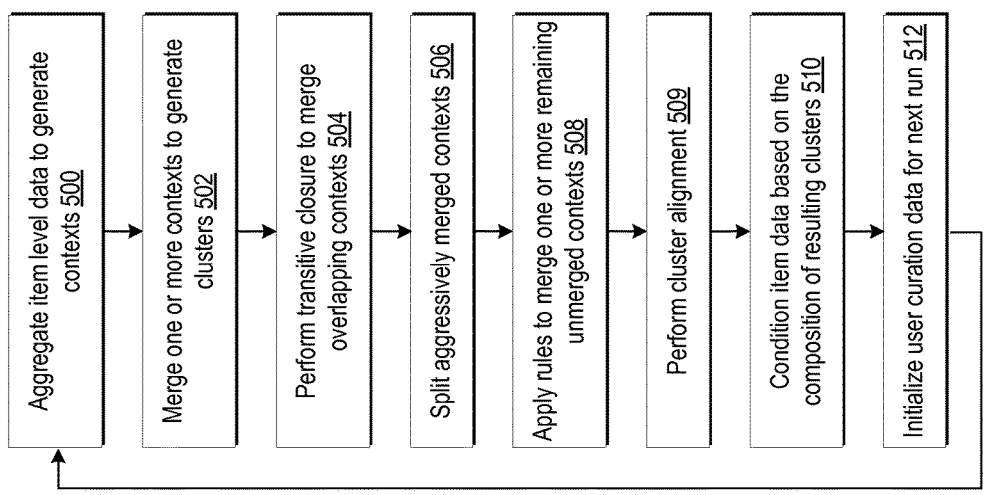
FIG. 5 illustrates a flowchart of an example method for providing highly scalable data clustering, according to some embodiments.

FIG. 5 illustrates a flowchart of a method for providing highly scalable data clustering as well as data normalization. As illustrated by block 500, the method may include aggregating item level data to generate contexts. For instance, this portion of the method may include generating contexts that include attributes as described above (e.g., brand name, product type, tokens, impact data) based on item-level data (e.g., data 111-119 described above). As illustrated by block 502, the method may include merging one or more contexts to generate clusters of contexts. For instance, as described above, contexts may be merged into clusters if they share a requisite quantity of tokens or have some other requisite measure of similarity. As illustrated by block 504, the method may include performing transitive closure on the clusters to merge overlapping contexts. For instance, as described above, some contexts may overlap based on different tokens. This portion of the method may use associative properties to merge these overlapping contexts. The merging of cluster B and cluster C into cluster D (FIG. 2) illustrates one example of this type of transitive closure. As illustrated at block 506, the method may also include splitting aggressively merged contexts. For instance, as described above with respect to FIG. 2, cluster D was merged together based on an erroneous brand name (e.g., "television") propagated up from item-level data. Splitting may utilize a list of known brands to form clusters containing corresponding contexts. Remaining contexts may be clustered with the known brands. Any remaining contexts that fail to become clustered may be considered outliers (e.g., such as context 203 described above). The method may also include applying one or more rules to merge one or more unmerged contexts 508. For instance, as described above, this portion of the method may include performing a heuristic process configured to enforce one or more rules on the clusters resulting from the splitting phase in order to catch and correct any edge cases that may have passed through previous components. For instance, as described above, brand contexts having brand attributes of the form "[Brand] running shoes for . . . " or "[Product line] by [Brand]" may be good candidates for merging with a preferred cluster.

As illustrated at block 509, cluster alignment may be performed to align the clusters resulting from block 508 with a set of previous clusters. For instance, new cluster sets may be generated over time (e.g., daily, weekly, monthly, etc.) and compared to previous sets of clusters, such as by utilizing the techniques of mapping logic 140 described above. For instance, such techniques may include utilizing the Hungarian algorithm for bipartite matching to map new clusters to older clusters. As illustrated at block 510, the method may also include normalizing item data based on the composition of the resulting clusters, such as described above with respect to the normalization process of FIG. 4. In various embodiments, the illustrated method may be repeated to create new clusters as new item level data is introduced over time. In various embodiments, as illustrated by block 512, each run of the method may also take into consideration any new user curation data. In various embodiments, user curation data may include information specifying contexts that are to remain separated throughout the clustering process. For instance, a user may desire to keep two specific clusters from being merged during subsequent runs of the illustrated method; these clusters may be specified by user curation data. Subsequent runs of the method may ensure that such clusters are not merged even in cases where the clustering logic would otherwise be inclined to merge such clusters absent the user curation data.

Other Considerations

In some embodiments, the splitting techniques described herein may be performed as a result of clustering logic 126 and transitive closure logic 132 using local information about contexts as opposed to aggregate information about clustered being formed. In some embodiments, an alternative to the clustering techniques described above may be utilized. For instance, in some cases weighted scores may be generated between contexts using the token-based analysis described above. For instance, the more TF-IDF tokens two contexts have in common, the higher the similar score between those contexts. These similarity scores may serve as edge weights for a weighted graph of contexts. In various embodiments, as an alternative to clustering logic 126, one or more clustering algorithms may be performed on such a weighted graph in order to identify clusters of contexts.

As described above, the clustering techniques and data normalizing techniques described herein may be performed on item level data for multiple items (e.g., items offered for sale in an electronic market place). In various embodiments, this item level information may change over time, such as when new item information is received from supplying vendors. The clustering analysis may be performed on a periodic or aperiodic basis in order to take into consideration the changes to item level information over time. In some cases, one or more techniques may be utilized to determine the difference(s) between the clustering results from one time period to the next, such as described above with respect to FIG. 1. In various embodiments, such techniques may include the Hungarian algorithm for bipartite matching.

Example Computer System

Various embodiments of a system and method for highly scalable data clustering, as described herein, may be executed on one or more computer systems, which may interact with various other devices. Note that any component, action, or functionality described above with respect to FIGS. 1-5 may be implemented via one or more computer systems configured as computer system 600 of FIG. 6, according to various embodiments. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions 622 implementing clustering component 624 (configured similar to clustering system 100 described above) and data normalizer 626 (configured to perform the data normalizing techniques described above) are shown stored within memory 620. Furthermore, item-level data (e.g., data 111-119 described above) is shown stored within system memory 620 as item-level data 634. Additionally, data 632 of memory 620 may store any of the information or data structures described above, in some embodiments. In some embodiments, program instructions and/or data may be received, sent or stored upon different types of computer-accessible media or on similar media separate from system memory 620 or computer system 600. In various embodiments, any of the components or systems illustrated above with respect to previous Figures may be implemented via such a computer system.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network 685 or between nodes of computer system 600. Network 685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Figure 6:
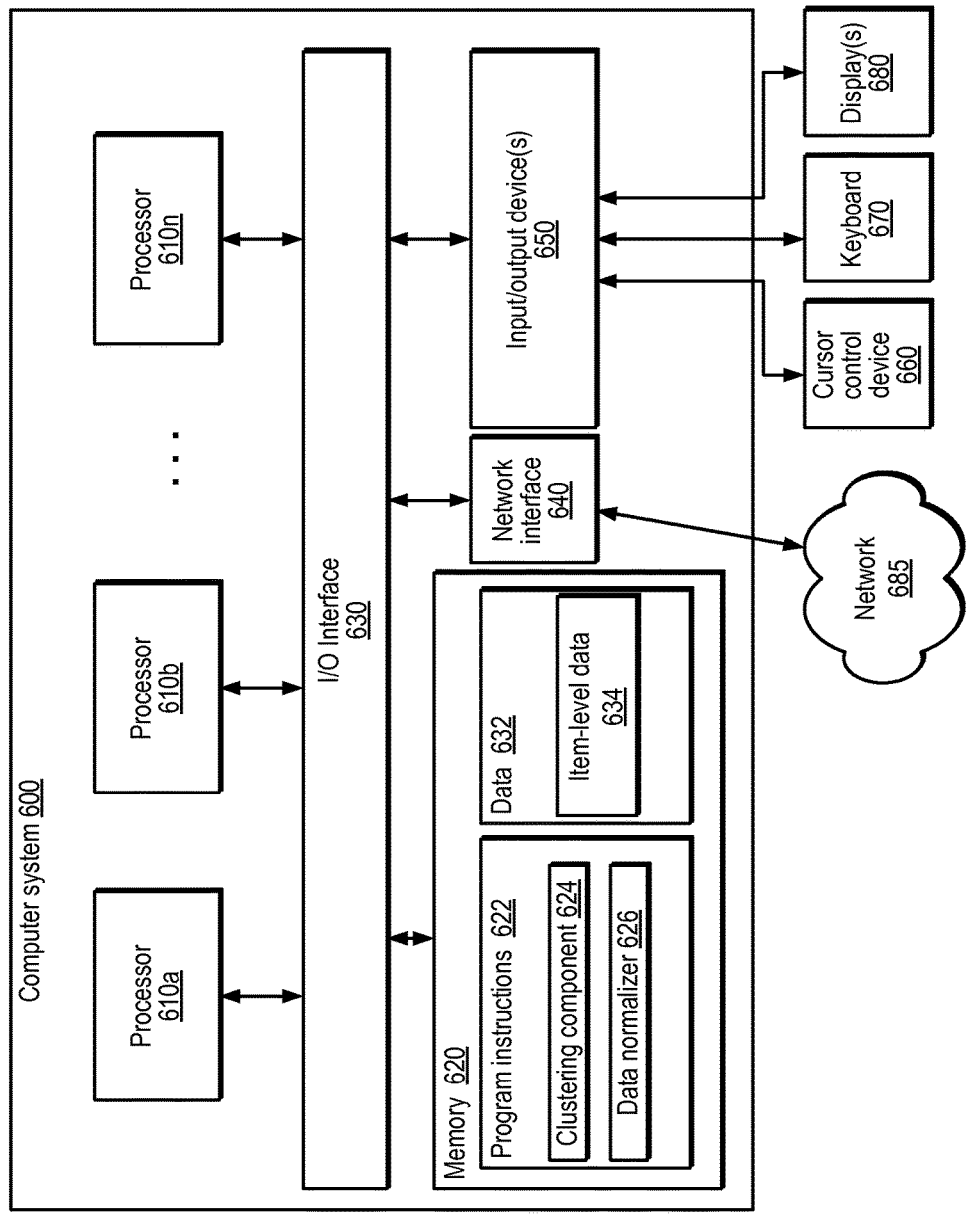
FIG. 6 illustrates one example of a computer system suitable for implementing various elements of the system and method for highly scalable data clustering, according to some embodiments.

As shown in FIG. 6, memory 620 may include program instructions 622 configured to implement any element or action described above. In one embodiment, the program instructions may implement the methods described above, such as the method illustrated by FIG. 5. In other embodiments, different elements and data may be included. Note that data 632 may include any data described above with respect to FIGS. 1-5.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Embodiments may be provided as a computer program product including a nontransitory machine-readable (e.g., computer-readable) storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments of this disclosure.

What is claimed is:

1. A method, comprising:
   determining, by aggregation logic implemented by a clustering system comprising one or more computing devices comprising one or more hardware processors and one or more memory devices, item attribute information from item-level data for multiple, different products to be offered on item detail pages of a network-based site, wherein the item-level data is retrieved from one or more data stores of a storage system;
   identifying, by the aggregation logic, a plurality of item attributes from the item attribute information, wherein each of the plurality of item attributes are representative of an aggregate characteristic of a respective plurality of the multiple different products;
   generating, by the aggregation logic, a plurality of contexts of information from the plurality of identified item attributes for the multiple, different products, wherein each context of the plurality of contexts includes a unit sales attribute, page views attribute, or a search yield attribute, and one or more tokens that each represent one of the plurality of item attributes, and wherein each respective context of the plurality of contexts represents a plurality of the multiple, different products having one or more aggregate characteristics represented by the tokens of the respective context;
   comparing, by clustering logic implemented by one or more computing devices of the clustering system, the one or more computing devices comprising one or more hardware processors and one or more memory devices, the tokens of different contexts to determine measures of similarity between the contexts, wherein the comparing comprises detecting that a first context and a second context include at least some tokens in common;
   grouping, by the clustering logic, at least some of the contexts into clusters of contexts based on the determined measures of similarity, wherein the grouping comprises grouping the first context and the second context into a common cluster;
   wherein said comparing the tokens, and said grouping at least some of the contexts, reduces overall time or computing resources spent to identify the clusters of contexts, thereby improving scalability of the clustering system based on:
      condensing a set of the multiple, different products into a smaller set of contexts for processing, and
      reducing a number of comparisons of contexts during cluster generation;
   based on results of the grouping the at least some of the contexts into clusters, designating, by the clustering logic, the first context as a preferred context for using item-level data represented by the first context for correcting item-level data represented by one or more other contexts in the common cluster, wherein the one or more other contexts includes the second context, and wherein the first context is selected for designation as the preferred context based on at least the first context having a highest impact, among the contexts of the common cluster, on a basis of the first context's unit sales, page views, or search yield;
   subsequent to grouping the first context and the second context into the common cluster, correcting item-level data represented by the second context based on item-level data represented by the first context, comprising:
      detecting conflicting values for at least one item attribute value between the first context and the second context;
      selecting at least one authoritative value corresponding to the at least one item attribute value, wherein the at least one authoritative value is based on the item-level data of the item represented by the first context; and modifying, at one or more respective data stores of the storage system, one or more item attributes of the item-level data corresponding to the at least one item attribute value and represented by the second context;

updating, based on the modified item-level data, one or more item detail listings of products represented by the second context, wherein the one or more item detail listings indicate the one or more item attributes; and providing, over a network, at least some of the updated one or more item detail listings for respective products in one or more item detail pages of the network-based site.

2. The method of claim 1, wherein the selecting the at least one authoritative value comprises determining that the second context is an alias context of the first context.

3. The method of claim 2, wherein the designating the first context as the preferred context is based on one or more of: aggregate unit sales of products associated with the first context, aggregate network page views of products associated with the first context, or aggregate search result statistics for products associated with the first context.

4. The method of claim 1, further comprising restricting, by the clustering logic, the comparing to contexts sharing at least one token in common.

5. The method of claim 1, wherein the modifying one or more item attributes of the item-level data corresponding to the at least one item attribute value and represented by the second context comprises:

modifying an attribute of the products represented by the second context to be the same as a corresponding attribute of the products represented by the first context.

6. A method, comprising:

determining, by aggregation logic implemented by a clustering system comprising one or more computing devices comprising one or more hardware processors and one or more memory devices, item attribute information from item-level data for multiple, different products to be offered on item detail pages of a network-based site, wherein the item-level data is retrieved from one or more data stores of a storage system;

identifying, by the aggregation logic, a plurality of item attributes from the item attribute information, wherein each of the plurality of item attributes are representative of an aggregate characteristic of a respective plurality of the multiple, different products;

generating, by the aggregation logic, a plurality of contexts of information from the plurality of identified item attributes for the multiple, different products, wherein each context of the plurality of contexts includes a unit sales attribute, page views attribute, or a search yield attribute, and one or more tokens that each represent one of the plurality of item attributes, and wherein each respective context of the plurality of contexts represents a plurality of the multiple, different products having one or more aggregate characteristics represented by the tokens of the respective context;

evaluating, by clustering logic implemented by one or more computing devices of the clustering system comprising one or more hardware processors and one or more memory devices, the tokens of different contexts to determine measures of similarity between the contexts, wherein the evaluating comprises detecting that at least two of the contexts include a plurality of tokens in common;

grouping, by the clustering logic, at least some of the contexts into clusters of contexts based on the determined measures of similarity, wherein the grouping comprises grouping the at least two contexts into a common cluster;

wherein said evaluating the tokens, and said grouping at least some of the contexts, reduces overall time or computing resources spent to identify the clusters of contexts, thereby improving scalability of the clustering system based on:

condensing a set of the products into a smaller set of contexts for processing, and reducing a number of comparisons of contexts during cluster generation;

designating, based on results of the grouping the at least some of the contexts into clusters, by the clustering logic, a first context as a preferred context for using item-level data represented by the first context for correcting item-level data represented by one or more other contexts in the common cluster, wherein the one or more other contexts includes a second context, and wherein the first context is selected for designation as the preferred context based on at least the first context having a highest impact, among the contexts of the common cluster, on a basis of the first context's unit sales, page views, or search yield;

correcting, subsequent to grouping the first context and the second context into the common cluster, item-level data represented by the second context based on item-level data represented by the first context, comprising:

detecting conflicting values for at least one item attribute value between the first context and the second context;

selecting at least one authoritative value corresponding to the at least one item attribute value, wherein the at least one authoritative value is based on the item-level data of the item represented by the first context; and modifying, at one or more respective data stores of the storage system, one or more item attributes of the item-level data corresponding to the at least one item attribute value and represented by the second context;

updating, based on the modified item-level data, one or more item detail listings of products represented by the second context, wherein the one or more item detail listings indicate the one or more item attributes; and providing, over a network, at least some of the updated one or more item detail listings for respective products in one or more item detail pages of the network-based site.

7. The method of claim 6, wherein the item-level data for a particular product comprises one or more of:

sales information specifying a quantity of units sold for the particular product;

detail page hits information specifying a quantity of page views of a network page that includes information about the particular product;

attribute information specifying attributes of the particular product that have been received from supplying vendors or manufacturers; or search impression information specifying a quantity of times in which the particular product appeared in search results or a quantity of times in which the particular product was selected from a list of search results.

8. The method of claim 7, wherein the correction of item-level data is performed in response to determining that the first context is a preferred context and a second context is an alias context of that preferred context.

9. The method of claim 8, further comprising designating, by the clustering logic, the first context as the preferred context based on one or more of: aggregate unit sales of products associated with the first context, aggregate network page views of products associated with the first context, or aggregate search result statistics for products associated with the first context.

10. The method of claim 7, wherein correcting item-level data of the product associated with the second context based on item-level data of the product associated with the first context comprises:
    modifying an attribute of the item-level data associated with the second context to be the same as a corresponding attribute of the item-level data associated with the first context.

11. The method of claim 6, further comprising restricting, by the clustering logic, the evaluating to contexts sharing at least one token in common.

12. A system, comprising:
    one or more memories; and
    one or more hardware processors coupled to the one or more memories, wherein the one or more memories comprise program instructions, that, when executed by the one or more hardware processors, cause the one or more hardware processors to implement:
        aggregation logic configured to:
            determine item attribute information from item-level data for multiple, different products to be offered on item detail pages of a network-based site, wherein the item-level data is retrieved from one or more data stores of a storage system;
            identify a plurality of item attributes from the item attribute information, wherein each of the plurality of item attributes are representative of an aggregate characteristic of a respective plurality of the multiple, different products;
            generate a plurality of contexts of information from the plurality of identified item attributes for the multiple, different products, wherein each context of the plurality of contexts includes a unit sales attribute, page views attribute or a search yield attribute, and one or more tokens that each represent one of the plurality of item attributes, and wherein each respective context of the plurality of contexts represents a plurality of the multiple, different products having one or more aggregate characteristics represented by the tokens of the respective context;
        clustering logic configured to:
            evaluate the tokens of different contexts to determine measures of similarity between the contexts, wherein the evaluating comprises detecting that at least two of the contexts include a plurality of tokens in common; and
            group at least some of the contexts into clusters of contexts based on the determined measures of similarity, wherein the grouping comprises grouping the at least two contexts into a common cluster;
            wherein said evaluate the tokens, and said group at least some of the contexts, reduces overall time or computing resources spent to identify the clusters of contexts, thereby improving scalability of the system based on:
                a smaller set of contexts for processing, and
                a reduced number of comparisons of contexts during cluster generation;
            designate, based on results of the grouping the at least some of the contexts into clusters, a first context as a preferred context for using item-level data represented by the first context for correcting item-level data represented by one or more other contexts in the common cluster, wherein the one or more other contexts includes a second context, and wherein the first context is selected for designation as the preferred context based on at least:
                user curation data that specifies that contexts are to remain separated, or
                the first context having a highest impact, among the contexts of the common cluster, on a basis of the first context's unit sales, page views, or search yield;
            correct, subsequent to grouping the first context and the second context into the common cluster, item-level data represented by the second context based on item-level data represented by the first context, where correct comprises:
                detect conflicting values for at least one item attribute value between the first context and the second context;
                select at least one authoritative value corresponding to the at least one item attribute value, wherein the at least one authoritative value is based on the item-level data of the item represented by the first context; and
                modify, at one or more respective data stores of the storage system, one or more item attributes of the item-level data corresponding to the at least one item attribute value and represented by the second context;
        wherein further program instructions, when executed by the one or more hardware processors, cause the one or more hardware processors to:
            update, based on the modified item-level data, one or more item detail listings of products represented by the second context, wherein the one or more item detail listings indicate the one or more item attributes; and
            provide, over a network, at least some of the updated one or more item detail listings for respective products in one or more item detail pages of the network-based site.

13. The system of claim 12, wherein the program instructions are further configured to cause the one or more processors to implement:
    transitive closure logic configured to:
        determine that two or more clusters overlap; and
        merge the two or more clusters into a single cluster;
    splitting logic configured to, for a merged cluster generated by the transitive closure logic:
        determine, based on a splitting criteria, whether the merged cluster is an aggressively merged cluster; and
        in response to a determination that the merged cluster is an aggressively merged cluster, split the aggressively merged cluster into two or more distinct clusters based on the splitting criteria, wherein the two or more distinct clusters differ from the two or more clusters merged by the transitive closure logic to form the merged cluster;

wherein the splitting criteria comprises a plurality of impact measurements associated with respective contexts that form the merged cluster, wherein the determining whether the merged cluster is an aggressively merged cluster comprises determining whether the merged cluster includes two or more high impact contexts that have respective impact measurements that exceed a threshold impact level, and wherein the split of the aggressively merged cluster comprises split the two or more high impact contexts into respective distinct clusters of the two or more distinct clusters.

14. The system of claim 13, wherein the splitting criteria comprises a list of attributes designated as distinct, wherein the determining whether the merged cluster is an aggressively merged cluster comprises determining whether the merged cluster includes two or more contexts that have respective item attribute information identified by the list of attributes as being distinct, and wherein the splitting the aggressively merged cluster comprises splitting the two or more contexts into respective distinct clusters of the two or more distinct clusters.

15. The system of claim 12, wherein the program instructions are further configured to cause the one or more processors to perform cluster alignment on said clusters and a previously generated set of clusters.

16. The system of claim 15, wherein to perform said cluster alignment, the program instructions are configured to cause the one or more processors to perform Hungarian techniques for bipartite matching.

17. A non-transitory computer-readable storage medium, storing program instructions, wherein the program instructions, when executed on one or more computers, cause the one or more computers to implement:

aggregation logic configured to:
  determine item attribute information from item-level data for multiple, different products, wherein the item-level data is retrieved from one or more data stores of a storage system; and
  identify a plurality of item attributes from the item attribute information, wherein each of the plurality of item attributes are representative of an aggregate characteristic of a respective plurality of the multiple different products;
  generate a plurality of contexts of information from the plurality of identified item attributes for the multiple, different products, wherein each context of the plurality of contexts includes a unit sales attribute, page views attribute or a search yield attribute, and one or more tokens that each represent one of the plurality of item attributes, and wherein each respective context of the plurality of contexts represents a plurality of the products having the plurality of item attributes represented by the tokens of the respective context; and clustering logic configured to:
  evaluate the tokens of different contexts to determine measures of similarity between the contexts, wherein the evaluating comprises detecting that a first context and a second context include at least some tokens in common;
  group at least some of the contexts into clusters of contexts based on the determined measures of similarity, wherein the grouping comprises grouping the first context and the second context into a common cluster;
  wherein said evaluate the tokens, and said group at least some of the contexts, reduces overall time or computing resources spent to identify the clusters of contexts, thereby improving scalability of the system based on:
    a smaller set of contexts for processing, and
    a reduced number of comparisons of contexts during cluster generation; and
  based on results of the grouping the at least some of the contexts into clusters, designate the first context as a preferred context for using item-level data represented by the first context for correcting item-level data represented by one or more other contexts in the common cluster, wherein the one or more other contexts includes the second context, wherein the first context is selected for designation as the preferred context based on at least the first context having a highest impact, among the contexts of the common cluster, on a basis of the first context's unit sales, page views or search yield;
  wherein, subsequent to the first context and the second context being grouped into the common cluster, item-level data represented by the second context is corrected based on item-level data represented by the first context, comprising:
    detecting conflicting values for at least one item attribute value between the first context and the second context;
    selecting at least one authoritative value corresponding to the at least one item attribute value, wherein the at least one authoritative value is based on the item-level data of the product represented by the first context; and
    modifying, at one or more respective data stores of the storage system, one or more item attributes of the item-level data corresponding to the at least one item attribute value and represented by the second context,
  wherein, subsequent to the one or more item attributes being modified, one or more item detail listings represented by the second context are updated based on the modified item-level data, wherein the one or more item detail listings indicate the one or more item attributes for products, and
  wherein, subsequent to the one or more item detail listings for respective products being updated, the one or more updated item detail listings are provided, over a network, in item detail pages of a network-based site.

18. The medium of claim 17, wherein the program instructions are further configured to cause the one or more computers to implement transitive closure logic configured to:
  determine that two or more clusters overlap; and
  merge the two or more clusters into a single cluster.

19. The medium of claim 18, wherein the program instructions are further configured to cause the one or more computers to implement splitting logic configured to, for at least one merged cluster generated by the transitive closure logic, split the merged cluster into two or more clusters based on a list of attributes designated as distinct.

20. The medium of claim 19, wherein the list of attributes designated as distinct is a list of brands designated as different brands.

21. The medium of claim 17, wherein the modifying one or more item attributes of the item-level data corresponding to the at least one item attribute value and represented by the second context comprises:

modifying an attribute of the product represented by the second context to be the same as a corresponding attribute of the represented by the first context.

22. The medium of claim 17, wherein the clustering logic is configured to limit the evaluating to contexts sharing at least one token in common.

23. The method of claim 1, wherein one or more of the tokens are generated using a term frequency-inverse document frequency analysis.

24. The method of claim 6, wherein one or more of the tokens are generated using a term frequency-inverse document frequency analysis.

25. The system of claim 12, wherein the program instructions cause the one or more processors to generate the one or more of the tokens are using a term frequency-inverse document frequency analysis.

26. The medium of claim 17, wherein the program instructions cause the one or more computers to generate the one or more of the tokens are using a term frequency-inverse document frequency analysis.

\* \* \* \* \*